(12) United States Patent
Ichikawa et al.

(10) Patent No.: US 11,892,362 B2
(45) Date of Patent: Feb. 6, 2024

(54) MULTI-POSITION TOLERANT CONTACT GAUGE

(71) Applicant: MITUTOYO CORPORATION, Kawasaki (JP)

(72) Inventors: Yuichi Ichikawa, Kawasaki (JP); Osamu Saito, Yokohama (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/444,313

(22) Filed: Aug. 3, 2021

(65) Prior Publication Data

US 2022/0042863 A1    Feb. 10, 2022

(30) Foreign Application Priority Data

Aug. 5, 2020    (JP) .................................. 2020-132843

(51) Int. Cl.
*G01L 1/04*     (2006.01)
*G01B 3/22*    (2006.01)
(Continued)

(52) U.S. Cl.
CPC ................ *G01L 1/044* (2013.01); *G01B 3/22* (2013.01); *G01B 5/0016* (2013.01); *G01L 1/042* (2013.01); *G01L 5/108* (2013.01)

(58) Field of Classification Search
CPC ......... G01L 1/044; G01L 1/042; G01L 5/108; G01B 3/22; G01B 5/16
(Continued)

(56) References Cited

U.S. PATENT DOCUMENTS 2,817,150 A * 12/1957 McPherson .............. G01B 5/06
33/501.05
3,983,633 A * 10/1976 Kaifesh .................... G01B 3/22
33/199 R
(Continued)

FOREIGN PATENT DOCUMENTS

DE          3440221 A1 *  5/1986
DE          3440221 C2 * 11/1993   ............. G01B 3/205
(Continued)

OTHER PUBLICATIONS

Translation JP-2001255102-A (Year: 2001).*
(Continued)

*Primary Examiner* — Mischita L Henson
*Assistant Examiner* — Monica S Young
(74) *Attorney, Agent, or Firm* — Oblon, McClelland, Maier & Neustadt, L.L.P.

(57) ABSTRACT

There is provided a measuring device (dial gauge) capable of performing measurement with a desired measuring force regardless of the posture of the measuring device.
A dial gauge in an exemplary embodiment of the present invention includes a measuring force adjustment unit provided to a body case and capable of moving and being positioned and fixed in a direction substantially parallel to a moving direction of a spindle.
A biasing means has one end directly or indirectly engaged with the spindle and the other end directly or indirectly engaged with the measuring force adjustment unit, and biases the spindle toward a tip end.
The measuring force adjustment unit includes an external thread portion and a connection supporting member having one end screwed with the external thread portion and the other end coupled to the biasing means. The connection supporting member is screw-fed by rotationally operating (Continued)

the external thread portion in such a manner that a position of the connection supporting member is changed and fixed.

7 Claims, 10 Drawing Sheets

(51) Int. Cl.
*G01B 5/00* (2006.01)
*G01L 5/108* (2020.01)

(58) Field of Classification Search
USPC .......................................................... 33/556
See application file for complete search history.

(56) References Cited

U.S. PATENT DOCUMENTS

| | | | | |
|---|---|---|---|---|
| 4,492,034 | A | * | 1/1985 | Nishina ................ G01B 11/007 33/558 |
| 4,566,201 | A | * | 1/1986 | Ishii .................... G01B 3/22 33/DIG. 6 |
| 4,765,064 | A | * | 8/1988 | Maeda .................. G01B 3/22 33/832 |
| 5,125,165 | A | * | 6/1992 | Gerhard ................ G01B 3/22 33/832 |

FOREIGN PATENT DOCUMENTS

| | | | | |
|---|---|---|---|---|
| DE | 3440221 A1 | * | 2/2013 | |
| GB | 2136572 A | * | 9/1984 | ............. G01B 21/00 |
| GB | 2192720 A | * | 1/1988 | ............. G01B 3/205 |
| JP | S6098001 U | | 7/1985 | |
| JP | H-052011 | * | 5/1986 | ............. G01B 3/205 |
| JP | H052011 U | * | 1/1993 | |
| JP | 3002418 U | | 9/1994 | |
| JP | 2001-255102 A | | 9/2001 | |
| JP | 2001255102 A | * | 9/2001 | |
| JP | 2008185358 A | * | 8/2008 | |
| JP | 2010197338 A | * | 9/2010 | |
| JP | 5208808 B2 | * | 6/2013 | |

OTHER PUBLICATIONS

Translation JPH-052011 (Year: 1993).*
ISO 463, "Geometrical Product Specifications (GPS)—Dimensional measuring equipment-Design and metrological characteristics of mechanical dial gauges", 2006, 3 pages.
Japanese Industrial Standard JIS B7503, "Dial gauge: Mechanical Dial gauges", 2017, 28 pages (with English Machine Translation).

* cited by examiner

MULTI-POSITION TOLERANT CONTACT GAUGE

INCORPORATION BY REFERENCE

This application is based upon and claims the benefit of priority from JP patent application No. 2020-132843, filed on Aug. 5, 2020 (DAS code 3A15), the disclosure of which is incorporated herein in its entirety by reference.

BACKGROUND OF THE INVENTION

1. Field of the Invention

The present invention relates to a measuring device.

2. Description of Related Art

As one of comparators, dial gauges are known. A dial gauge includes a contact point at a tip end of a spindle that is movable forward and backward in the axial direction, and biases the spindle toward the tip end with a spring or the like. (For example, JP 3002418 U and JP 2001-255102 A)

SUMMARY OF THE INVENTION

ISO463 is revised in 2006, and JISB7503 is revised in 2011.
(See https://www.iso.org/standard/42802.html and http://kikakurui.com/b7/B7503-2011-01.html)
The revised ISO and JIS stipulate, as metrological characteristics of dial gauges, that "metrological characteristics unless specified by manufacturers . . . must satisfy MPEs and MPLs in any posture".

Thus, the use of dial gauges in a posture other than a normal posture (a contact point facing downward) has been increasing, and it is desired that dial gauges maintain the same measurement accuracy in any posture other than the normal posture (a contact point facing downward) as that in the normal posture (a contact point facing downward).

However, a dial gauge is configured to bias a spindle toward one side (a tip end side) with a spring or the like and, for this reason, has a problem that if its posture is changed to, for example, a normal posture (a contact point facing downward), an inverted posture (the contact point facing upward), a lateral posture (the contact point being horizontal), or the like, the measuring force also changes. In addition, because of having such a configuration for biasing a spindle toward one side (a tip end side) with a spring or the like, a dial gauge has another problem that the measuring force changes in its measurement range (in a stroke of the spindle).

In view of the above, a purpose of the present invention is to provide a measuring device capable of performing measurement with a desired (or specified) measuring force regardless of the posture of the measuring device.

A measuring device according to an exemplary embodiment of the present invention includes a spindle having an elongate rod-like body and a tip end provided with a contact point brought into contact with an object to be measured;
 a body case supporting the spindle in such a manner as to move forward and backward in an axial direction;
 a measuring force adjustment unit provided to the body case and capable of moving and being positioned and fixed in a direction substantially parallel to a moving direction of the spindle; and a biasing means for biasing the spindle toward the tip end and having one end directly or indirectly engaged with the spindle and the other end directly or indirectly engaged with the measuring force adjustment unit.

In an exemplary embodiment of the present invention, it is preferable that
 the measuring force adjustment unit includes:
 an external thread portion; and
 a connection supporting member having one end screwed with the external thread portion and the other end coupled to the biasing means,
 the body case includes a through hole provided in substantially parallel to the moving direction of the spindle,
 the measuring force adjustment unit is disposed in the through hole, and
 the connection supporting member is screw-fed by rotationally operating the external thread portion in such a manner that a position of the connection supporting member is changed and fixed.

In an exemplary embodiment of the present invention, it is preferable that
 the body case includes a slide groove provided in substantially parallel to the moving direction of the spindle,
 the slide groove includes an engaging groove formed in a direction orthogonal to an axial direction of the slide groove, and
 the measuring force adjustment unit is provided in such a manner as to slide in the slide groove, includes a key projection engaged with or disengaged from the engaging groove, and is positioned and fixed by engaging the key projection with the engaging groove.

In an exemplary embodiment of the present invention, it is preferable that
 an outer face of the body case or an outer face of the measuring force adjustment unit has a point allowing the measuring force adjustment unit to be positioned and fixed, and
 the point is provided with index values indicating measuring force applied to the spindle by the biasing means when the measuring force adjustment unit is at the point.

In an exemplary embodiment of the present invention, it is preferable that the index values are provided in a plurality of sequences corresponding to a plurality of posture patterns of the measuring device.

In an exemplary embodiment of the present invention, it is preferable that the index values are provided in the plurality of sequences each corresponding to when a posture of the measuring device is a normal posture, an inverted posture, or a lateral posture.

In an exemplary embodiment of the present invention, it is preferable that
 an outer face of the body case or an outer face of the measuring force adjustment unit has a point allowing the measuring force adjustment unit to be positioned and fixed, and
 the point is provided with an inter-graduation distance.

DETAILED DESCRIPTION

Figure 1:
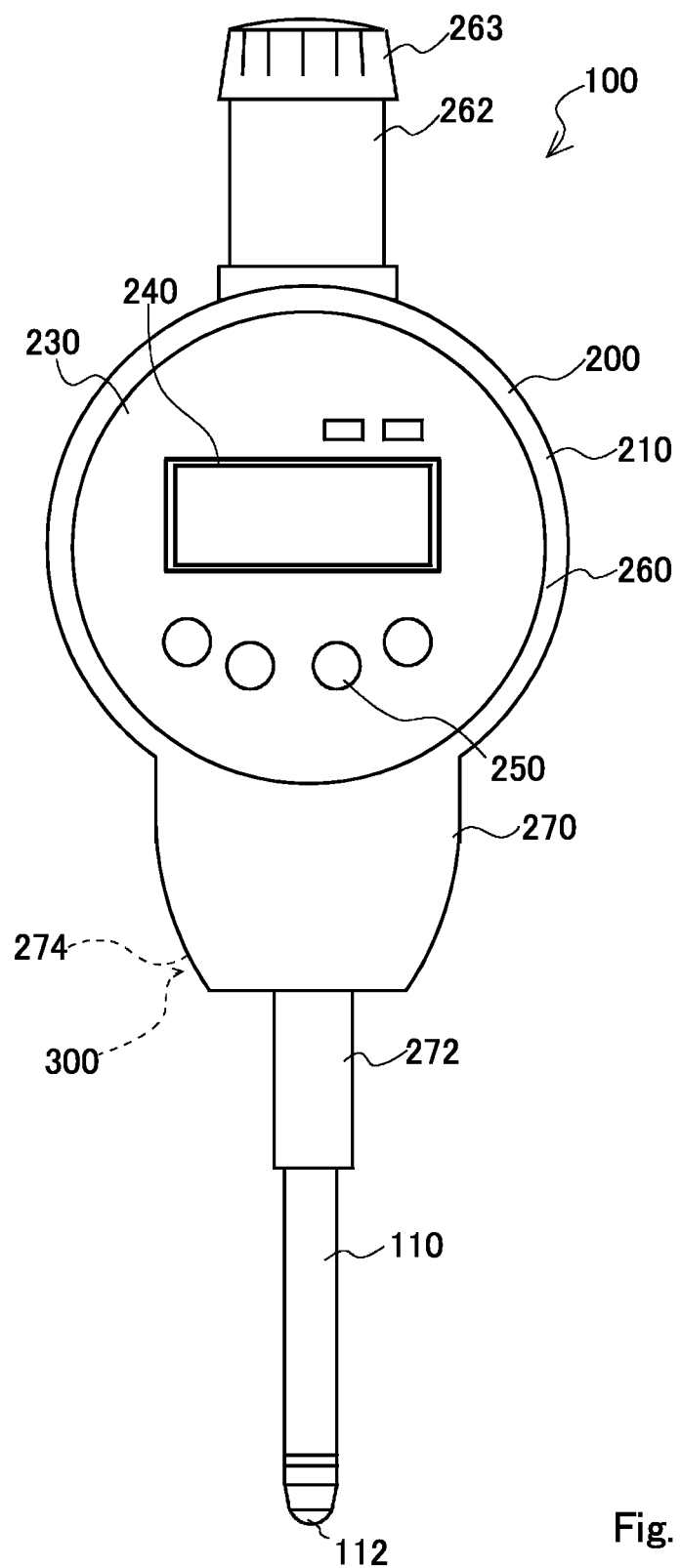
FIG. 1 is a front view of a dial gauge (measuring device) according to a first exemplary embodiment.

An exemplary embodiment of the present invention is illustrated and described with reference to reference signs attached to the elements in the drawings.

First Exemplary Embodiment

FIG. 1 is a front view of a dial gauge (measuring device) according to a first exemplary embodiment.

Figure 2:
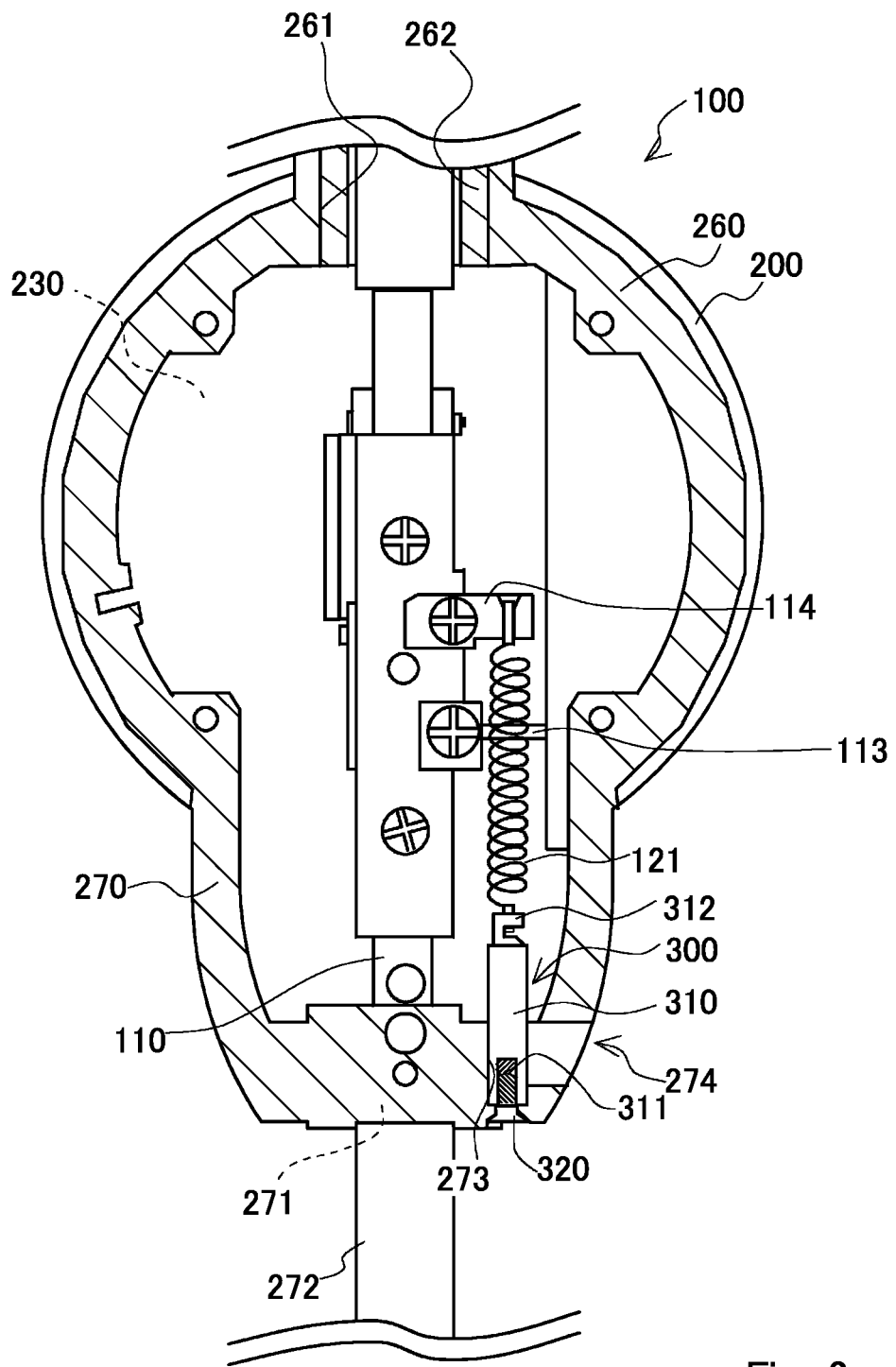
FIG. 2 is a diagram showing an internal structure of the dial gauge (measuring device) according to the first exemplary embodiment.

FIG. 2 is a diagram showing an internal structure of the dial gauge (measuring device) according to the first exemplary embodiment.

In the description for the exemplary embodiment, a digital display dial gauge is exemplified as a dial gauge (measuring device).

A digital display dial gauge is also referred to as a digital dial gauge, an indicator, a digital indicator, a test indicator, a linear gauge, or the like. In addition, the present exemplary embodiment exemplifies a digital dial gauge, but the present invention is applicable to an analogue display dial gauge (analogue dial gauge) that enlarges the displacement of a spindle with a gear train and displays it with a pointer and a dial face.

A dial gauge 100 includes a body case 200, a spindle 110, a biasing means 121, and a measuring force adjustment unit 300. The spindle 110 is provided to the body case 200 in such a manner as to move forward and backward in an axial direction. The biasing means 121 biases the spindle 110 toward a tip end.

The body case 200 includes an external frame body 210 having a cylindrical shape as a whole, a back lid body 220, and a front lid body 230, and defines a storage space inside thereof.

When the dial gauge 100 is placed in a normal posture and the body case 200 is viewed from the front, the body case 200 has a shape in which a large circular portion (260) is provided at the upper part, and a relatively small rectangular or trapezoidal additional body (270) is attached to the lower part of the circular portion (260). Here, the large circular portion at the upper part is referred to as a first housing portion 260, and the additional body is referred to as a second housing portion 270.

When viewed from the front, a display unit 240 (digital display unit) is disposed in the center region of the front lid body 230, and a plurality of switches 250 (for example, button switches 250) is disposed below the display unit 240.

As shown in FIG. 2, the first housing portion 260 and the second housing portion 270 are not separated from each other, and their internal spaces are continuous.

In the upper side face of the first housing portion 260, a through hole 261 (referred to as an upper through hole 261) is provided, and an upper stem bush 262 is attached to the upper through hole 261. In addition, a cap 263 is provided in such a manner as to close the upper stem bush 262. In the lower side face of the second housing portion 270, a through hole 271 (referred to as a lower through hole 271) is provided, and a lower stem bush 272 is attached to the lower through hole 271.

The spindle 110 is provided in such a manner as to pass through the body case 200 and move forward and backward in the axial direction.

On the base end (upper end) side of the spindle 110, the spindle 110 passes through the upper through hole 261 and is borne by the upper stem bush 262. On the tip end (lower end) side, the spindle 110 is borne by the lower stem bush 272 at a middle portion of the spindle 110, and the tip end (lower end) of the spindle 110 is provided with a contact point 112.

At a middle portion of the spindle 110, a locking pin 113 is mounted and fixed in such a manner as to project in a direction orthogonal to the axial line of the spindle 110. Inside the body case 200, a groove parallel to the axial line of the spindle 110 is provided. The tip end of the locking pin 113 is engaged with the groove, whereby the spindle 110 is slidable in the axial direction while being locked.

In addition, at another middle portion of the spindle 110, a force receiving pin 114 is mounted and fixed in such a manner as to project in the direction orthogonal to the axial line of the spindle 110.

As the biasing means, a spring 121 (a coil spring 121) is used in the present exemplary embodiment. Note that, an elastic body, such as rubber (synthetic resin), may be used as the biasing means.

The spring 121 is disposed in parallel to the spindle 110 inside the body case 200. The base end of the spring 121 is fixed to the force receiving pin 114. The tip end of the spring 121 is fixed to the measuring force adjustment unit 300.

The measuring force adjustment unit 300 includes a connection supporting member 310 and an external thread portion 320.

The connection supporting member 310 has an elongate columnar shape as a whole. On one end of the connection supporting member 310, an internal thread 311 is provided and is screwed with the external thread portion 320. On the other end of the connection supporting member 310, a hook 312 is provided, and the tip end of the spring 121 is latched to the hook 312.

In the lower side face of the second housing portion 270, a through hole is provided right next to the lower through hole 271 through which the spindle 110 passes. This through hole is referred to as an operation through hole 273.

The lower end exit of the operation through hole 273 has a diameter not allowing the screw head of the external thread portion 320 to pass through, or a step for reducing the diameter is provided near the lower end exit of the operation through hole 273 in order for the screw head of the external thread portion 320 not to pass through.

In addition, in order to lock the connection supporting member 310, an engaging means is provided on the inner peripheral surface of the operation through hole 273 and an outer peripheral surface of the connection supporting member 310. For example, a slit 274 (groove line) along the through hole is provided on the inner peripheral surface of the operation through hole 273, and a pin (projection) fitted to the slit 274 is provided on the outer peripheral surface of the connection supporting member 310.

With this engaging means, the connection supporting member 310 is disposed inside the operation through hole 273 while being locked. Then, when the external thread portion 320 is rotated, the connection supporting member 310 moves forward or backward in the direction parallel to the moving direction of the spindle 110 by screw feeding.

As shown in FIG. 2, the base end of the spring 121 is fixed to the force receiving pin 114, and the tip end of the spring 121 is latched to the hook 312 of the connection supporting member 310.

At this time, the spring 121 is drawn to be longer than the natural length, and the spring 121 applies the force to the spindle 110 via the force receiving pin 114 in a direction in which the spindle 110 is biased (drawn) toward the tip end (lower end). Then, when the external thread portion 320 of the measuring force adjustment unit 300 is rotationally operated to raise or lower the position of the connection supporting member 310, the elongation amount of the spring 121 changes, and the magnitude of the force biasing (drawing) the spindle 110 toward the tip end (lower end) changes. In other words, by changing and adjusting the position on the tip end side (fixed side) of the spring (biasing means) 121, the measuring force can be changed and adjusted. That is, the measuring force of the dial gauge 100 is variably adjustable.

A detailed description of the internal structure is omitted, but an encoder (linear encoder) that detects the displacement of the spindle 110 and various electric circuit units are provided in the housing portion of the body case 200.

The electric circuit units include a display control unit that controls display of the digital display unit 240, an arithmetic processing circuit that processes a detection signal from the encoder to calculate the position of the spindle 110 (the contact point 112), and a ROM or RAM that stores various settings (origin setting).

Figure 3:
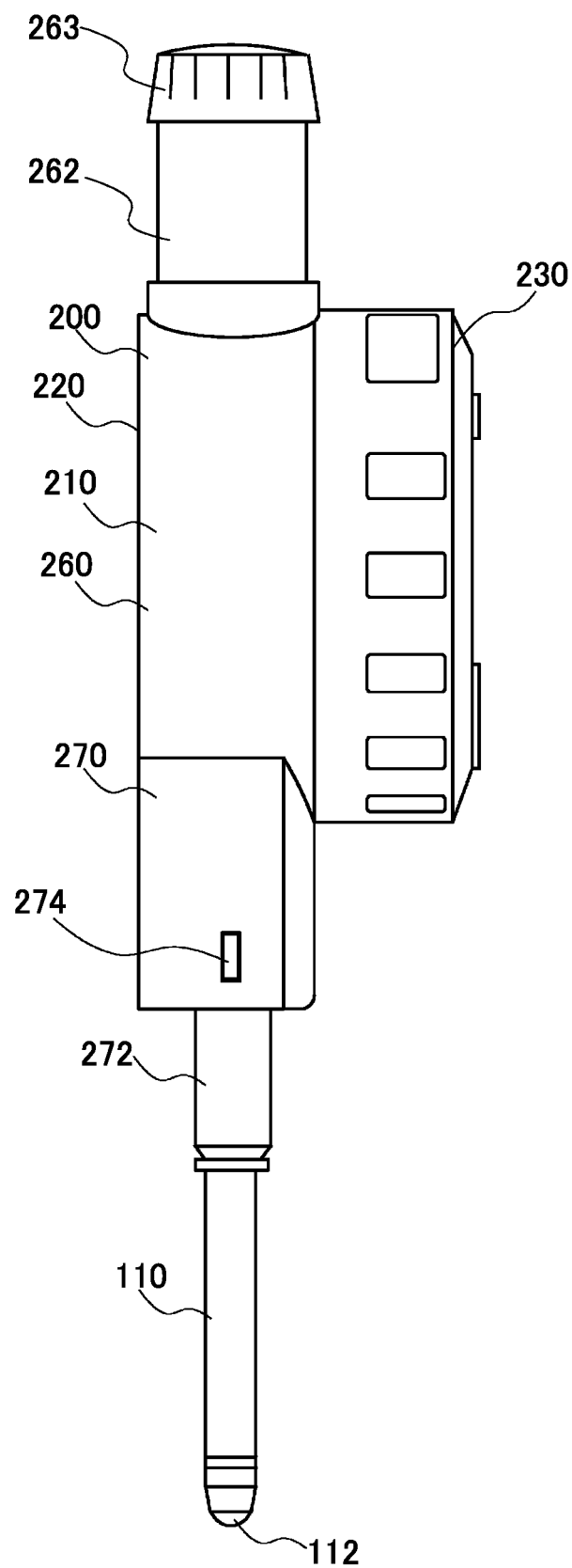
FIG. 3 is a side view of the dial gauge (measuring device)

Next, FIG. 3 is a side view of the dial gauge 100.

At a point of the second housing portion 270 of the body case 200, the slit 274 is provided, and the connection supporting member 310 is visible from outside through the slit 274.

Since the connection supporting member 310 is only required to be seen through, it is desirable that the slit 274 is filled or pasted with transparent resin in order to prevent oil (droplet) and dust from entering.

Note that, the slit 274 is on the side face of the dial gauge 100 in the present exemplary embodiment, but the slit 274 may be on the front face or the back face.

Figure 4:
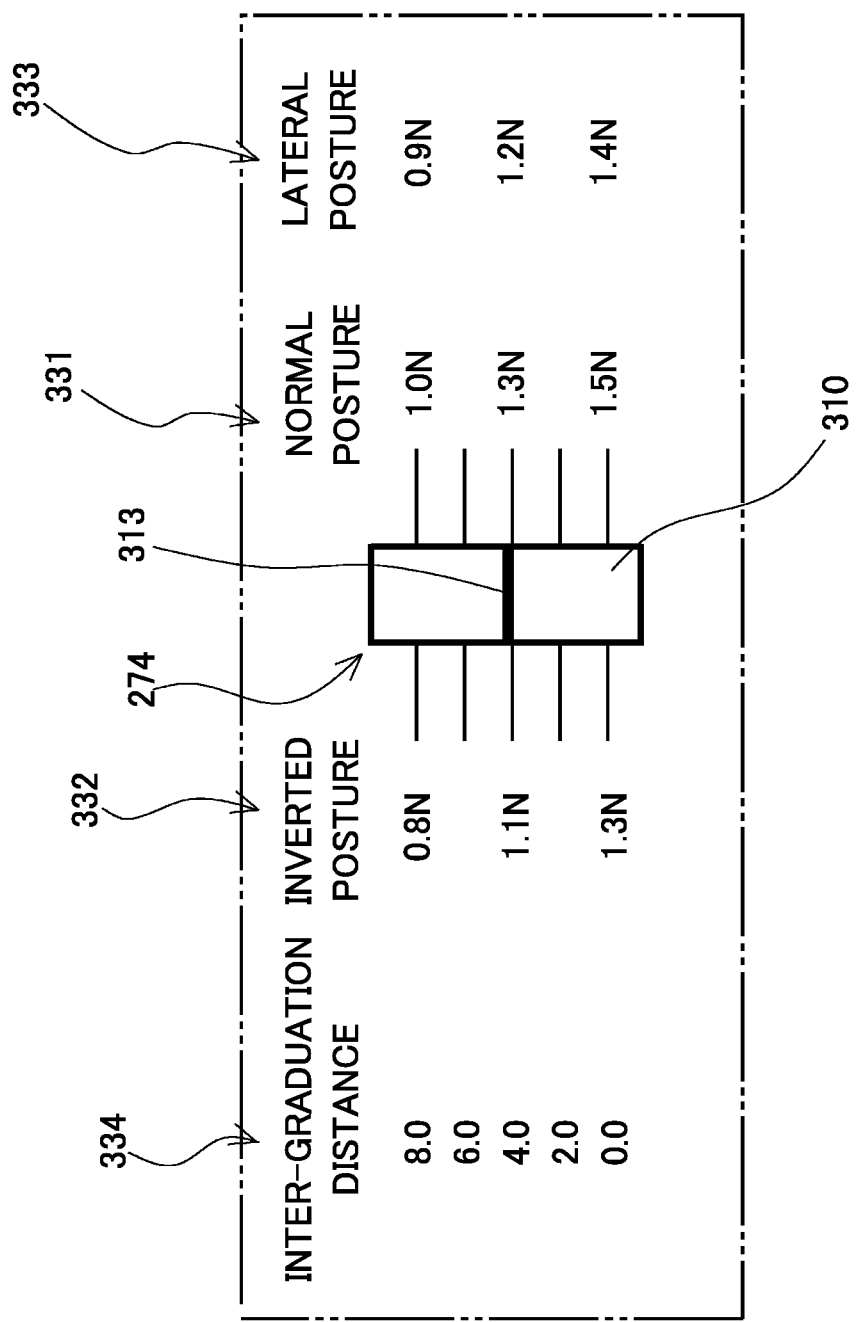
FIG. 4 is an enlarged view around a slit.

FIG. 4 is an enlarged view around the slit 274.

On an outer face of the connection supporting member 310, a mark 313 indicating the position of the connection supporting member 310 is provided.

Here, the mark 313 is a line but may be a dot or another shape.

Here, the reason that the body case 200 has, in addition to the large-circular first housing portion 260, the second housing portion 270 as an additional body is to see the connection supporting member 310 through the slit 274 by devising the shape.

Regarding the second housing portion 270, it is preferable that the distance (thickness) between the face in which the slit 274 is provided and the operation through hole 273 is relatively thin.

Figure 5:
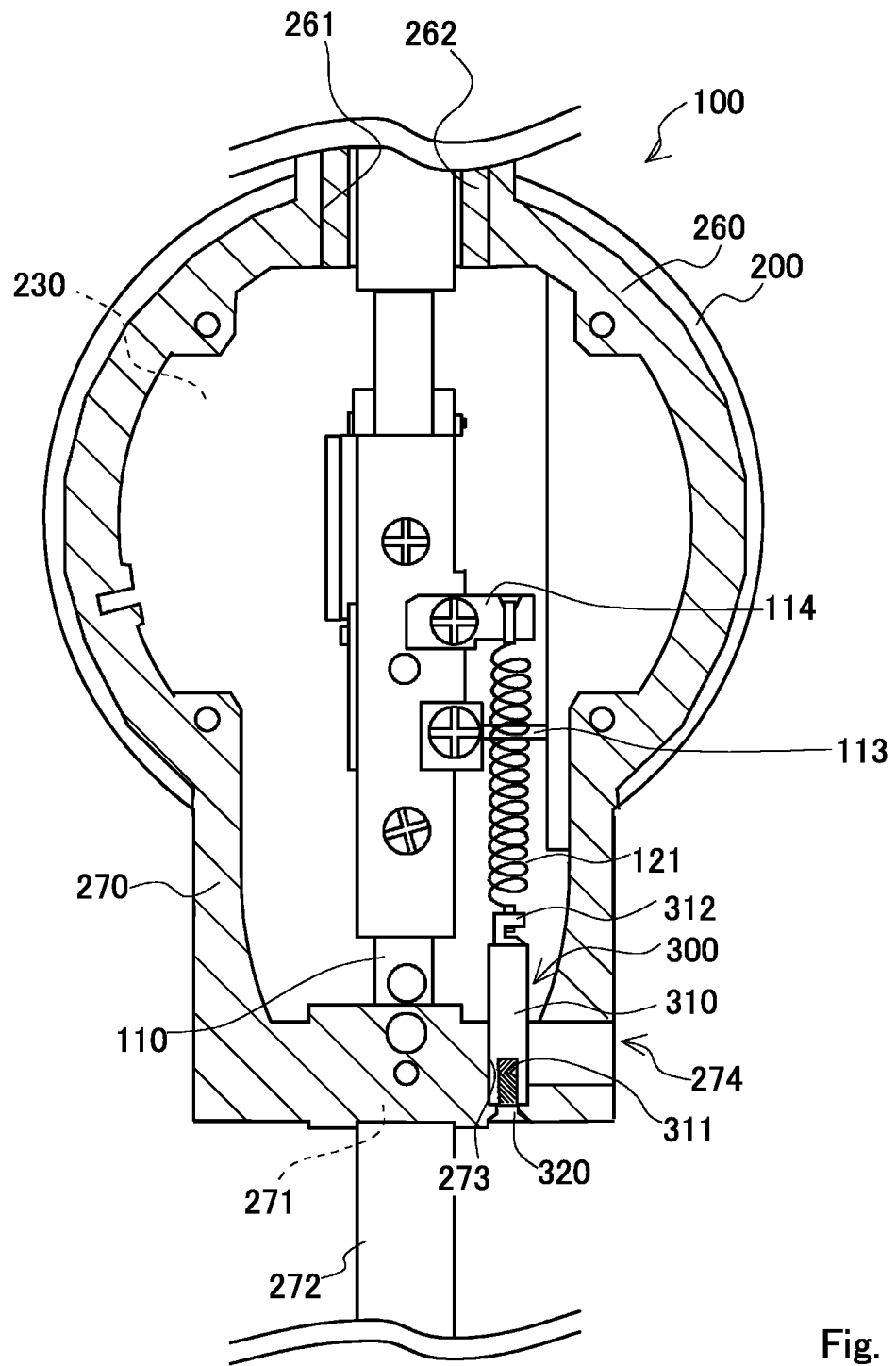
FIG. 5 is a diagram exemplifying a modification.

In addition, it is preferable that the face in which the slit 274 is provided is as parallel as possible to the moving direction of the spindle 110 as exemplified in, for example, FIG. 5.

Then, on an outer face of the second housing portion 270, measuring force graduations are provided along the slit 274.

In the example in FIG. 4, there are three sequences of measuring force graduations of:

a measuring force graduation when the dial gauge 100 is in a normal posture (a normal-posture measuring force graduation 331),
a measuring force graduation when the dial gauge 100 is in an inverted posture (an inverted-posture measuring force graduation 332), and
a measuring force graduation when the dial gauge 100 is in a lateral posture (a lateral-posture measuring force graduation 333).

Note that, conceivable six patterns of placing the dial gauge 100 are:
(A) the contact point 112 facing downward,
(B) the contact point 112 facing upward,
(C) the contact point 112 facing rightward (and the display face facing upward),
(D) the contact point 112 facing rightward (and the display face facing downward),
(E) the contact point 112 facing rightward (and the display face facing forward), and
(F) the contact point 112 facing rightward (and the display face facing backward).

Here, "(A) the contact point 112 facing downward" is set as the normal posture of the dial gauge 100.

"(B) the contact point 112 facing upward" is set as the inverted posture of the dial gauge 100.
Then, "(C) to (F) in which the contact point 112 is in parallel and faces either rightward or leftward regardless of the direction of the display face" is set as the lateral posture of the dial gauge 100.

If the dial gauge 100 is placed in the normal posture, the force (measuring force) when the contact point 112 is brought into contact with an object to be measured is the resultant force of the tensile force of the spring 121 and the weight of the spindle 110 itself.

Meanwhile, if the dial gauge 100 is placed in the inverted posture, the measuring force is the difference obtained by subtracting the weight of the spindle 110 itself from the tensile force of the spring 121.

In this manner, if the posture of the dial gauge 100 is changed, the measuring force changes accordingly. Taking this into consideration, the normal-posture measuring force graduation 331 indicates the measuring force corresponding to the position of the connection supporting member 310 when the dial gauge 100 is in the normal posture. The inverted-posture measuring force graduation 332 indicates the measuring force corresponding to the position of the connection supporting member 310 when the dial gauge 100 is in the inverted posture. The lateral-posture measuring force graduation 333 indicates the measuring force corresponding to the position of the connection supporting member 310 when the dial gauge 100 is in the lateral posture.

Figure 6:
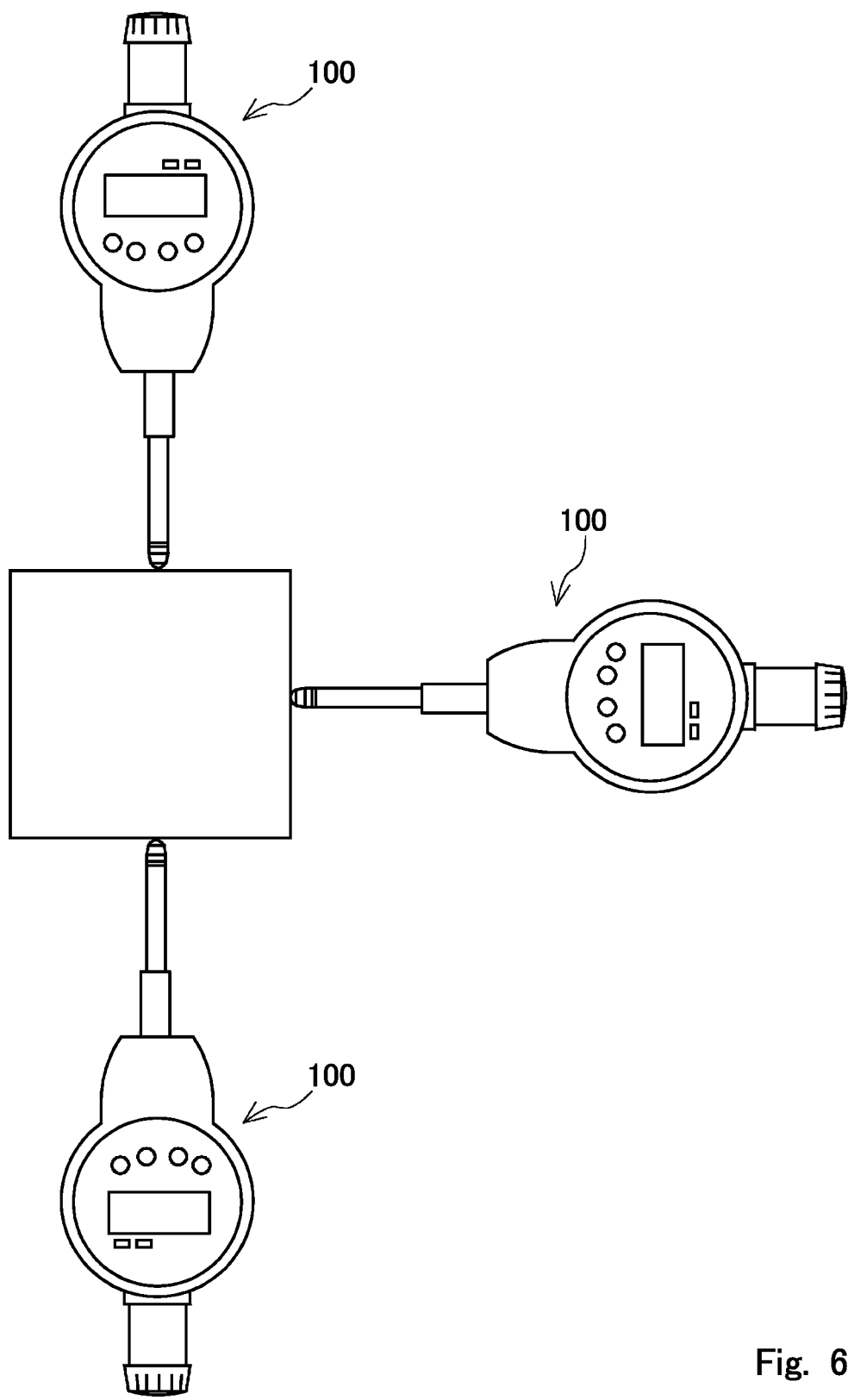
FIG. 6 is a diagram showing that an object to be measured is subjected to multipoint measurement in multiple directions.

For example, when an object to be measured is subjected to simultaneous multipoint measurement in multi-directions as exemplified in FIG. 6, by adjusting the measuring forces of the dial gauge 100 in the normal posture, the inverted posture, and the lateral posture to be the same, it is possible to more accurately perform shape inspection on the object to be measured.

For these index values of the measuring force graduations, values actually measured at product shipping may be engraved, or a sticker may be pasted on the side face of the body case 200. In addition, in order to cope with aging deterioration of the spring 121, it is preferable that the measuring force is actually measured once a year to calibrate the index values of the measuring force graduations.

Note that, due to the structure in which the spindle 110 is drawn with the spring 121, the measuring force changes within the measurement range (a stroke of the spindle 110). Thus, it is necessary to determine that the index values of the measuring force graduations each indicate the measuring force at which position the spindle 110 is. For example, the index values of the measuring force graduations may be determined to each indicate the measuring force when the spindle 110 projects most. Alternatively, the starting point may be a position where the spindle 110 is slightly pushed in (for example, 0.1 mm or more; prespan).

Figure 7:
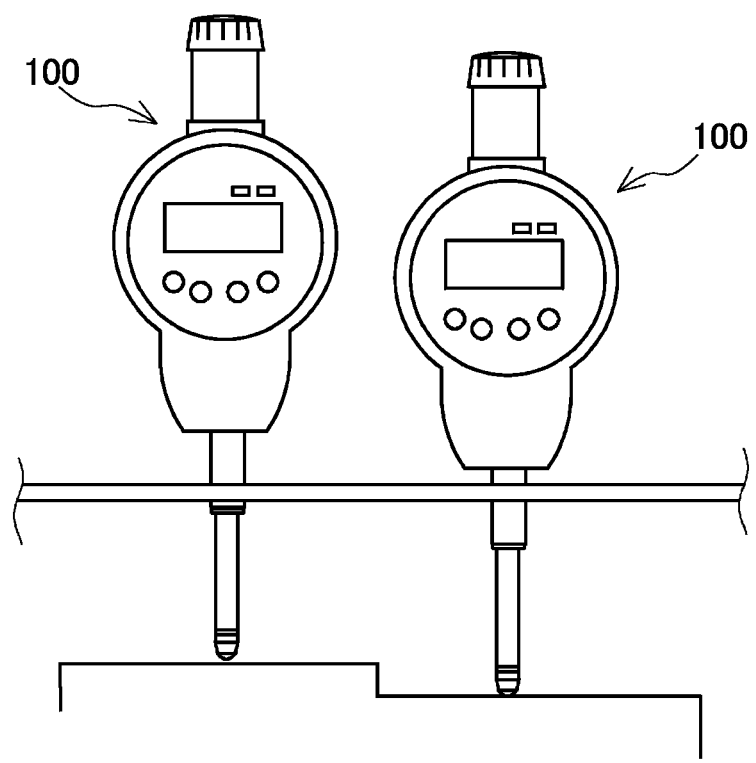
FIG. 7 is a diagram showing that an object to be measured having a step is subjected to simultaneous multi-point measurement.

In addition, it is preferable to provide another sequence for an inter-graduation distance 334 simply indicating the position of the connection supporting member 310, such as a length graduation provided to a straight ruler. Due to the structure in which the spindle 110 is drawn with the spring 121, the measuring force changes within the measurement range (a stroke of the spindle 110). Thus, due to the size or shape of an object to be measured, the measuring force changes depending on a point in the measurement range (a stroke of the spindle 110) at which the contact point 112 is brought into contact with the object to be measured. For example, if an object to be measured having a step is subjected to multipoint measurement as exemplified in FIG. 7, variation in the measuring force occurs depending on the measurement point. Thus, in the case of, for example, using two dial gauges 100 in FIG. 7, by adjusting the positions of the connection supporting members 310 to have the difference of the step, the measuring forces of the two dial gauges 100 can be adjusted to be substantially the same.

As described above, with the dial gauge 100 according to the present exemplary embodiment, it is possible to perform measurement with a desired (or specified) measuring force regardless of the posture of the measuring device or the size of a workpiece.

(First Modification)

Figure 8:
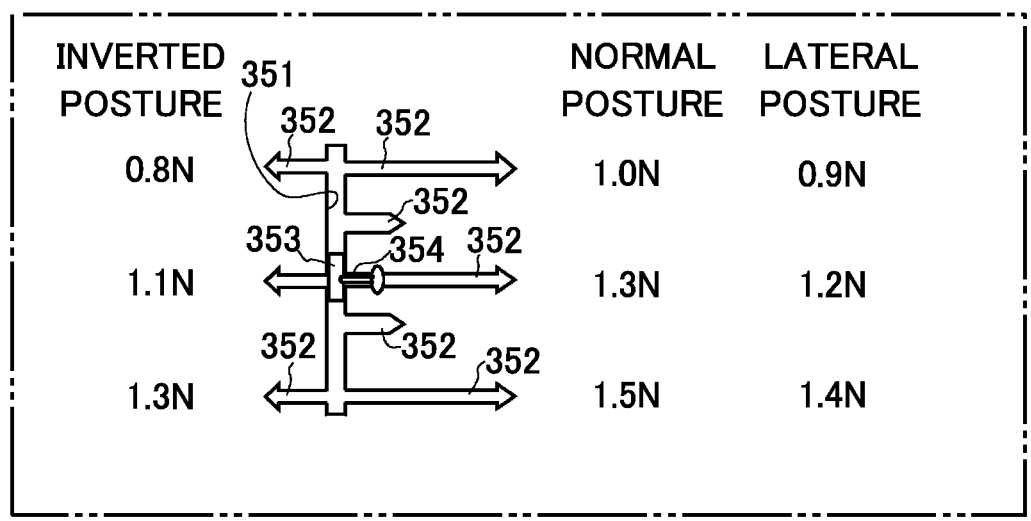
FIG. 8 is a diagram exemplifying a modification.

The measuring force adjustment unit 300 may have, for example, a configuration as shown in FIG. 8.

The body case 200 (the second housing portion 270) is provided with a slide groove 351 in substantially parallel to the moving direction of the spindle 110. In addition, the slide groove 351 is provided with a plurality of engaging grooves 352 in a direction orthogonal to the axial direction. The measuring force adjustment unit 300 is provided as a slider 353 slidable in the slide groove 351. Naturally, the spring 121 is latched to one end of the slider 353. The slider 353 is provided with a key projection 354 in order for the position of the slider 353 to be changed and fixed by engaging or disengaging the key projection 354 with or from the engaging grooves 352.

(Second Modification)

Figure 9:
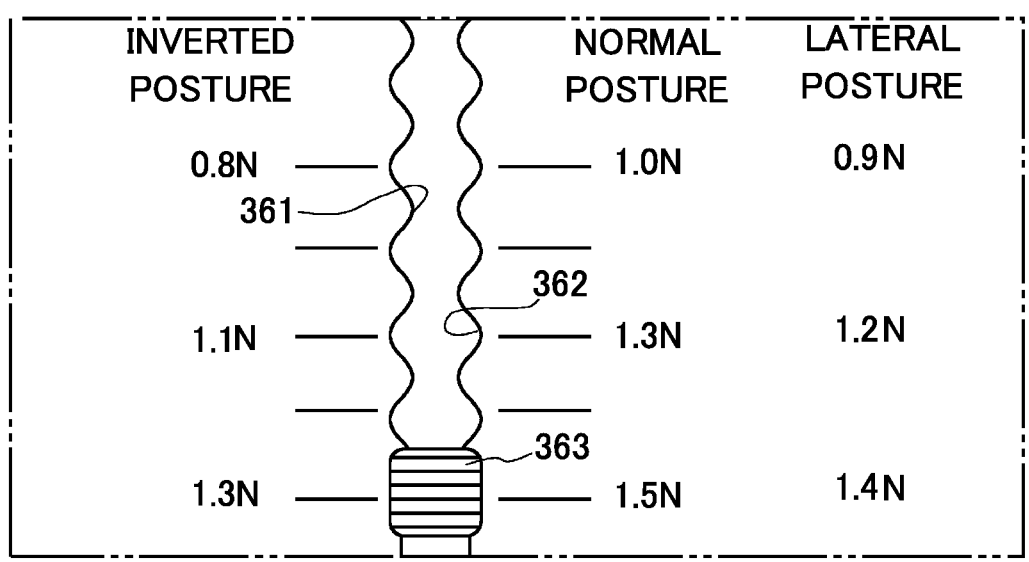
FIG. 9 is a diagram exemplifying a modification.

Alternatively, the measuring force adjustment unit 300 may have, for example, a configuration as shown in FIG. 9.

The body case 200 (the second housing portion 270) is provided with a slide groove 361 in substantially parallel to the moving direction of the spindle 110. In addition, the slide groove 361 is provided with a plurality of engaging grooves 362 in a direction orthogonal to the axial direction. Here, the engaging grooves 362 are wave-like uneven shapes provided on both opposing walls of the slide groove 361. (For example, the recessed portions of the wave-like uneven shapes are regarded as the engaging grooves 362.)

The measuring force adjustment unit 300 is provided as a slider 363 slidable in the slide groove 361. The slider 363 is provided with key projections on both sides in order for the position of the slider 363 to be changed and fixed by engaging or disengaging the key projections 364 with or from the engaging grooves 362.

(Third Modification)

Figure 10:
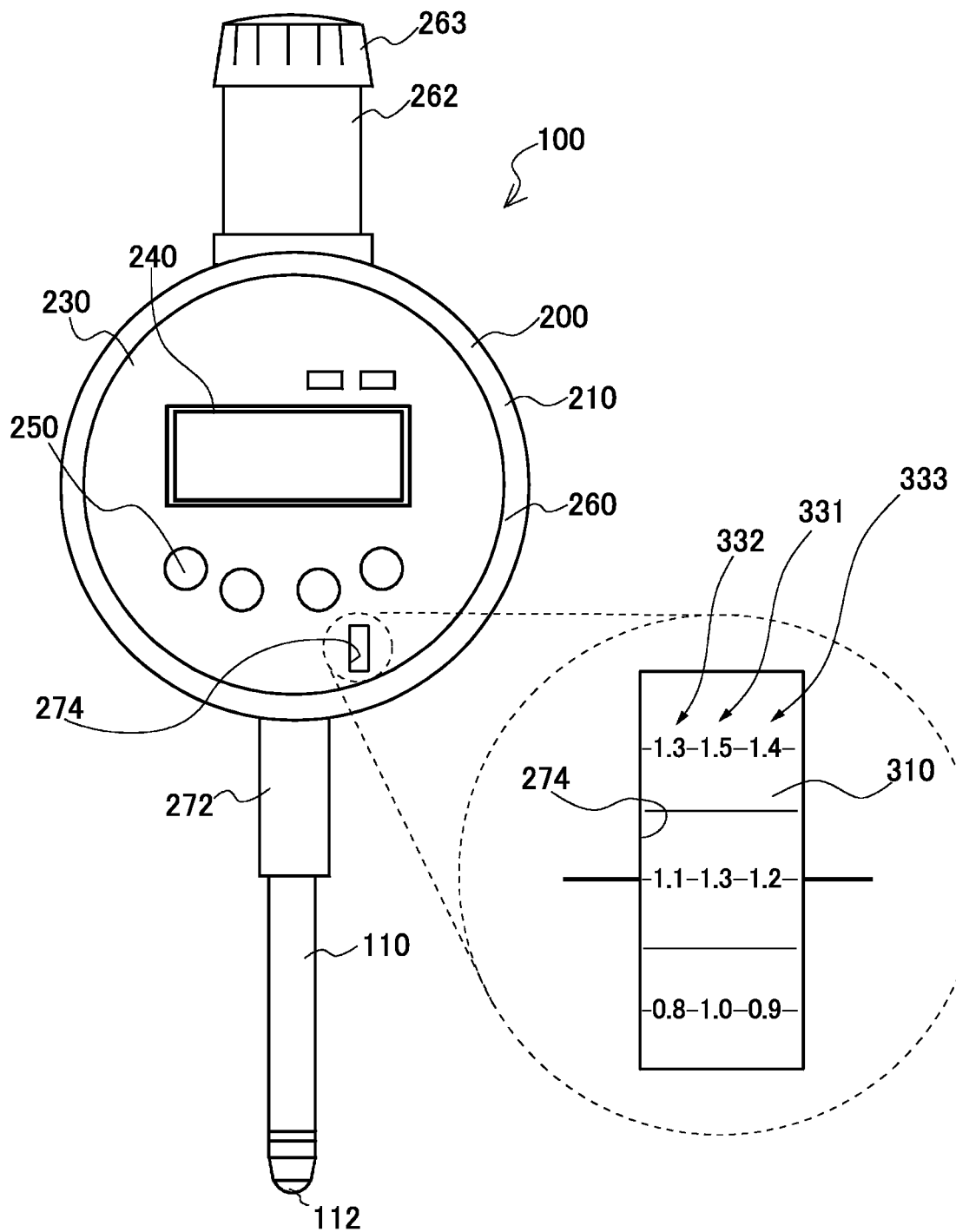
FIG. 10 is a diagram exemplifying a modification.

The slit 274 is provided on the side face of the body case 200 in the above exemplary embodiment, but the slit 274 may be provided on, for example, the front face of the body case 200 as exemplified in FIG. 10.

In addition, in the example in FIG. 10, the graduations (the normal-posture measuring force graduation 331, the inverted-posture measuring force graduation 332, and the lateral-posture measuring force graduation 333) are provided not on the surface of the body case but on the connection supporting member 310.

Note that, the present invention is not limited to the above exemplary embodiment and can be appropriately modified without departing from the scope.

In the above exemplary embodiment, the measuring force adjustment unit 300 is provided at the lower part of the body case 200 of the dial gauge 100. However, the measuring force adjustment unit 300 may be provided at the upper part of the body case 200 of the dial gauge 100.

In this case, an operation through hole is provided next to the upper through hole 261, and the force pushing the spindle toward the tip end (downward) like a compression coil spring may be used as the biasing means.

100 Dial gauge
110 Spindle
112 Contact point
113 Locking pin
114 Force receiving pin
121 Spring
200 Body case
210 External frame body
220 Back lid body
230 Front lid body
240 Display unit
250 Switch
260 first housing portion
261 Upper through hole
262 Upper stem bush
263 Cap
270 second housing portion
271 Lower through hole
272 Lower stem bush
273 Operation through hole
274 Slit
300 Measuring force adjustment unit
310 Connection supporting member
311 Internal thread
312 Hook
313 Mark
320 External thread portion
331 Normal-posture measuring force graduation
332 Inverted-posture measuring force graduation
333 Lateral-posture measuring force graduation
334 Inter-graduation distance
351 slide groove
352 engaging groove
353 slider
354 key projection
361 Slide groove
362 Engaging groove
363 Slider

The invention claimed is:

1. A shape measuring device comprising:
a spindle having an elongate rod-like body and a tip end provided with a contact point brought into contact with an object to be measured;

a body case supporting the spindle in such a manner as to move forward and backward in an axial direction;
an adjustment unit to adjust measuring force on the spindle provided in the body case and capable of positioning by moving in a direction substantially parallel to a moving direction of the spindle and of thereafter fixed during spindle movement; and
a biasing means for biasing the spindle toward the tip end and having one end directly or indirectly engaged with the spindle and the other end directly or indirectly engaged with the adjustment unit,
wherein an outer face of the body case or an outer face of the adjustment unit has index values indicating measuring force applied to the spindle by the adjustment unit,
wherein the index values are provided corresponding to a posture of the measuring device such that index values are provided for at least two of normal-posture measure force, an inverted-posture, and a lateral-posture, and wherein
the body case includes a slide groove of the adjustment unit for adjusting a force level of the adjustment unit and provided in substantially parallel to the moving direction of the spindle,
the slide groove includes an engaging groove formed in a direction orthogonal to an axial direction of the slide groove, and
the adjustment unit is provided in such a manner as to have a portion slide in the slide groove, includes a key projection engaged with or disengaged from the engaging groove, and is positioned and fixed by engaging the key projection with the engaging groove indicating the posture of the adjustment unit.

2. The measuring device according to claim 1, wherein the adjustment unit includes:
   an external thread portion; and
   a connection supporting member having one end screwed with the external thread portion and the other end coupled to the biasing means,
the body case includes a through hole provided in substantially parallel to the moving direction of the spindle,
the adjustment unit is disposed in the through hole, and
the connection supporting member is screw-fed by rotationally operating the external thread portion in such a manner that a position of the connection supporting member is changed and thereafter fixed.

3. The measuring device according to claim 1, wherein the index values indicating measuring force applied to the spindle by the adjustment unit are positioned with respect to a hole in the body case such that a mark on the adjustment unit is viewable through the hole and permits indication by the index values.

4. The measuring device according to claim 3, wherein the index values are provided in a plurality of sequences corresponding to a plurality of posture patterns of the measuring device.

5. The measuring device according to claim 1, wherein by changing and adjusting the position of the adjustment unit, the measuring force is changed and adjusted.

6. A shape measuring device comprising:
a spindle having an elongate rod-like body and a tip end provided with a contact point brought into contact with an object to be measured;
a body case supporting the spindle in such a manner as to move forward and backward in an axial direction;
an adjustment unit to adjust measuring force on the spindle provided in the body case and capable of positioning by moving in a direction substantially parallel to a moving direction of the spindle and of thereafter fixed during spindle movement; and
a biasing means for biasing the spindle toward the tip end and having one end directly or indirectly engaged with the spindle and the other end directly or indirectly engaged with the adjustment unit,
wherein an outer face of the body case or an outer face of the adjustment unit has index values indicating measuring force applied to the spindle by the adjustment unit,
wherein the index values are provided in the plurality of sequences each corresponding to when a posture of the measuring device is one of a normal posture, an inverted posture, or a lateral posture,
wherein an outer face of the body case or an outer face of the adjustment unit has inter-graduation distance scale marks indicating the position of the adjustment unit, and
wherein
the body case includes a slide groove of the adjustment unit for adjusting a force level of the adjustment unit and provided in substantially parallel to the moving direction of the spindle,
the slide groove includes an engaging groove formed in a direction orthogonal to an axial direction of the slide groove, and
the adjustment unit is provided in such a manner as to have a portion slide in the slide groove, includes a key projection engaged with or disengaged from the engaging groove, and is positioned and fixed by engaging the key projection with the engaging groove indicating the posture of the adjustment unit.

7. A shape measuring method comprising:
adjusting, using an adjusting unit, a measuring force on a spindle having an elongate rod-like body and a tip end provided with a contact point brought into contact with an object to be measured provided in a body case supporting the spindle in such a manner as to move forward and backward in an axial direction;
positioning, using the adjusting unit, by moving in a direction substantially parallel to a moving direction of the spindle and of thereafter fixing during spindle movement; and
biasing the spindle toward the tip end and having one end directly or indirectly engaged with the spindle and the other end directly or indirectly engaged with the adjustment unit,
wherein an outer face of the body case or an outer face of the adjustment unit has index values indicating measuring force applied to the spindle by the adjustment unit, and
wherein the index values are provided corresponding to a posture of the measuring device such that index values are provided for at least two of normal-posture measure force, an inverted-posture, and a lateral-posture.

* * * * *